Sept. 24, 1935.  D. SILVERMAN  2,015,537

PROTECTIVE SYSTEM FOR VAPOR ELECTRIC CONVERTERS

Filed March 29, 1934

WITNESSES:

INVENTOR
Daniel Silverman
BY
ATTORNEY

Patented Sept. 24, 1935

2,015,537

UNITED STATES PATENT OFFICE 2,015,537

PROTECTIVE SYSTEM FOR VAPOR ELECTRIC CONVERTERS

Daniel Silverman, Wilkinsburg, Pa., assignor to Westinghouse Electric & Manufacturing Company, East Pittsburgh, Pa., a corporation of Pennsylvania Application March 29, 1934, Serial No. 718,095

7 Claims. (Cl. 175—363)

My invention relates to a protective system for a vapor electric converter and particularly to a system for interrupting the excitation current to make-alive electrodes of a make-alive type converter.

Vapor electric converters of the type used for transferring energy between alternating current and direct current systems are subject to internal short circuits, or so-called backfires. When such an internal short circuit is established, it is necessary to disconnect the converter and extinguish the back-firing arcs before the rectifier can be returned to service. In the type of converters having make-alive excitation, that is, the make-alive electrodes which establishes a new cathode spot at the biginning of each conducting half cycle in the converter valves, it is possible to extinguish the converter arcs by interrupting the flow of current to the make-alive electrodes.

It is an object of my invention, therefore, to provide a system responsive to backfires for interrupting the make-alive excitation of the several valves of a make-alive type converter.

In the system according to my invention, each of the control valves for the make-alive electrodes is provided with a suitable blocking grid. These grids are supplied with blocking potential by a relay system responsive to the fault condition in the converter. This relay may be a back current relay connected to the direct current bus of the converter, or it may be a relay energized by the abnormal voltage conditions set up in the transformer supplying the make-alive type valves.

Figure 1:
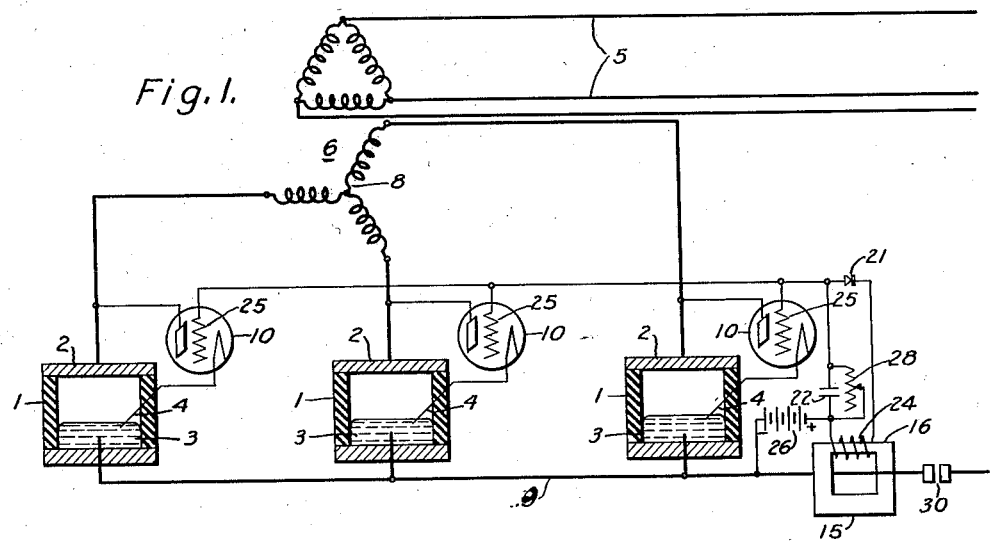
Figure 2:
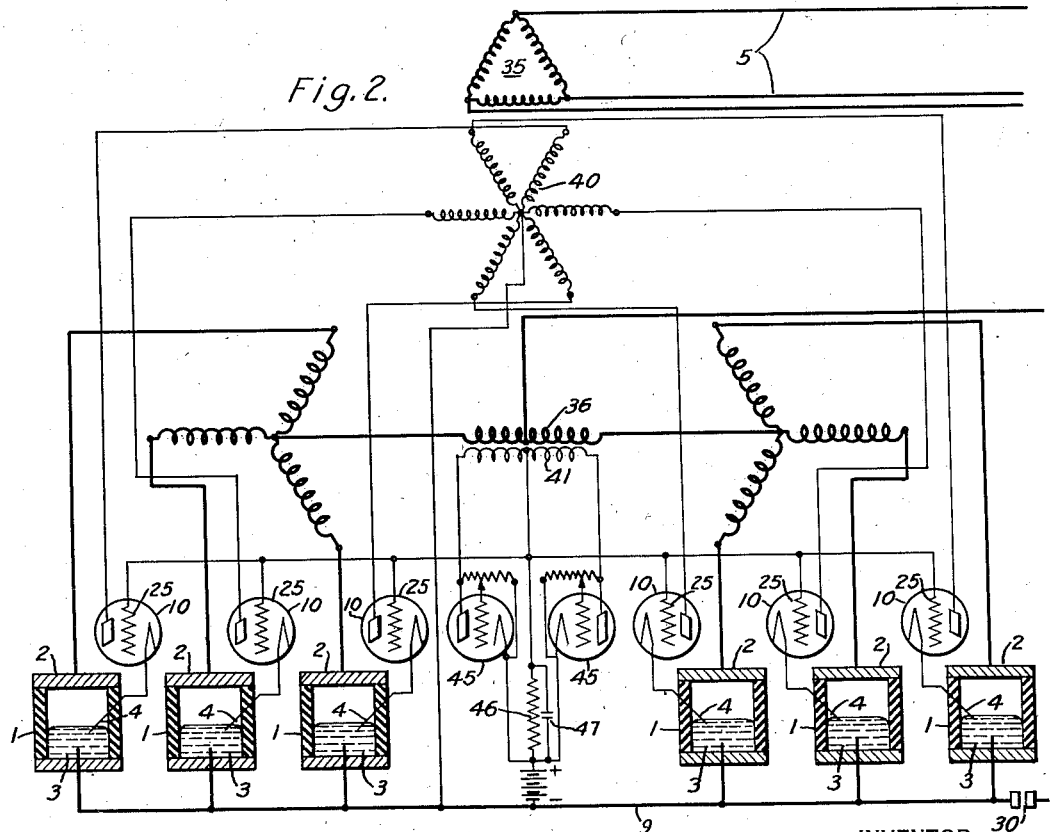

Other objects and advantages of my invention will be apparent from the following detailed description taken in conjunction with the accompanying drawing in which:

Figure 1 is a schematic illustration of a converter system employing my invention, and Fig. 2 is a similar view of a converter having a relay responsive to the abnormal current condition in a portion of the supply transformer.

In the embodiment of my invention according to Fig. 1, the converter comprises a plurality of make-alive type valves 1, each having a single anode 2 and a cathode 3 with a make-alive electrode 4 for establishing the cathode spots. The converter valves 1 are connected to a suitable alternating current circuit 5, preferably by means of a suitable transformer 6. For purposes of illustration, I have shown a transformer having a star connected winding 8 connected to the anodes 2 of the converter valves 1, the cathodes being connected to a common direct current bus 9.

The make-alive electrodes 4 of each valve 1 are connected to the corresponding anode 2 through a suitable unidirectional conductor such as an auxiliary electric valve 10. The cathode bus 9 of the converter is provided with a suitable reverse current relay. While this relay may be of any suitable type, I prefer to use a relay having no movable parts and having a magnetic circuit 15 associated with the cathode bus 9 for producing relay potential upon the occurrence of a reverse current flow in the direct current bus 9. My preferred relay comprises a magnetic circuit 15 of high permeability embracing the direct current bus 9 and having one side 16 of reduced cross-section. The side of reduced cross-section is of such proportions with respect to the remaining magnetic circuit 15 that the residual magnetism of the magnetic circuit 15 will substantially saturate the portion 16 of reduced cross-section. A suitable winding 20 is provided on this section 16 of reduced area and connected through a unidirectional conductor 21 to a suitable capacitor 22 so that the reversal of current in the direct current bus 9 will cause current to flow in the winding through the unidirectional conductor 21 to charge the capacitor 22. Each of the auxiliary valves 10 for the make-alive electrodes 4 is provided with a suitable grid 25 which is connected to the capacitor 12 in such a manner that the charge imparted to the condenser 22 by the potential generated in the reverse current relay will block the grids 25 and prevent current flow to the make-alive electrodes 4.

The positive side of the capacitor 22 is connected to the positive bus 9 preferably through a suitable direct current bias 26 which ordinarily maintains the blocking grids 25 at a positive potential with respect to the cathodes 3 of the converter. In order to release the grids 25 after a suitable time interval, a discharging resistor 28 is placed in parallel with the blocking capacitor 22.

In the operation of the system, the biasing potential 26 normally maintains the grids 25 of the auxiliary valves 10 at a positive potential so that when the anodes 2 of the converter are positive, current will flow from the anodes 2 through the make-alive electrodes 4 and establish a cathode spot, and permit the striking of the normal conducting arcs in the converter. However, when a backfire occurs in any of the valves 1 of the converter, the reverse current relay will produce a potential which charges the blocking capacitor 22 in such a manner that negative potential is placed on the grids 25 and effectively prevents current flow through the make-alive electrodes 4 of the converter valves 1.

The flow of direct current from the direct current system is interrupted by means of a suitable high speed breaker 30, thus effectively extinguishing the inverse or faulty converter section. The by-pass resistor 28 of the blocking capacitor 22 will discharge the capacitor 22 after a given time interval and permit normal current flow from the anodes 2 to the make-alive electrodes 4. By making the discharging resistor 28 adjustable, the time interval during which the converter remains out of operation may be adjusted.

In the modification of my invention according to Fig. 2, the converter system comprises a transformer 35 having an interphase winding 36 traversed by the normal load current of the converter. While the make-alive electrodes of the individual valves 1 may be connected to the anodes 2 of these valves 1, I prefer to provide an independent source of potential for the make-alive electrodes. This may conveniently be an auxiliary winding 40 in the main rectifier transformer 35. Associated with the interphase transformer 36 is a suitable auxiliary winding 41 having its terminals connected through suitable valves 45 to a blocking circuit for the auxiliary make-alive control valves 10.

On the occurrence of a backfire, a high potential direct current surge will appear across the interphase transformer 36 and induce a high potential in the auxiliary winding 41. This potential will break down one or the other of terminal valves of the auxiliary winding and cause current to flow in a local blocking circuit. This current flows through a suitable resistor 46 and impresses a negative voltage on the grid control circuits of the auxiliary valves 10. Since the current flow in the auxiliary winding 41 may not be maintained for a sufficient time to effectively block all of the make-alive electrodes 4, a suitable capacitor 47 is connected in the grid controlled circuit to maintain blocking potential for a suitable time interval after the cessation of the surge in the interphase transformer 36.

While I have shown and described specific embodiments of my invention, it is apparent that changes and modifications can be made therein without departing from the true spirit and scope of my invention.

I claim as my invention:

1. A converter system comprising an alternating current system, a direct current system, a plurality of make-alive type valves for transferring energy between said systems, a make-alive electrode in each valve, a connection from said make-alive electrode to the anode of the converter valve, an auxiliary valve in said connection, a relay responsive to fault in said converter, a grid in said auxiliary valve and means energized by said relay for impressing blocking potential on said grids for interrupting current flow to said make-alive electrode.

2. In combination with a vapor-electric converter, a make-alive electrode for each valve of the converter, a source of excitation current connected to said make-alive electrodes, a protective system comprising a winding arranged in inductive relation to a portion of the converter system, a valve in series with said winding adapted to prevent current flow in said winding during normal operation of the converter and to permit current flow on the occurrence of a backfire and a control circuit energized by flow of current in said winding for interrupting the flow of excitation current to said converter.

3. In combination with a vapor-electric converter, a make-alive electrode for each valve of the converter, a source of excitation current connected to said make-alive electrodes, a protective system comprising a winding arranged in inductive relation to a portion of the converter system, a valve in series with said winding adapted to prevent current flow in said winding during normal operation of the converter and to permit current flow on the occurrence of a backfire and a control circuit energized by flow of current in said winding for interrupting the flow of excitation current to said converter and energy storing means associated with said control circuit for maintaining the interruption of the excitation current for a predetermined time interval after the cessation of current flow in said winding.

4. A protective system for a make-alive type converter fed from a transformer utilizing an interphase transformer and having control valves for supplying current to the make-alive electrodes comprising an auxiliary winding coupled with the interphase winding, valves connected to the terminals of said winding, a return circuit to said winding, an impedance in said return circuit, control grids in the make-alive control valves and means for impressing the voltage across said impedance on said control grids.

5. A protective system for a make-alive type converter fed from a transformer utilizing an interphase transformer and having control valves for supplying current to the make-alive electrodes comprising an auxiliary winding coupled with the interphase winding, valves connected to the terminals of said winding, a return circuit to said winding, an impedance in said return circuit, control grids in the make-alive control valves and means for impressing the voltage across said impedance on said control grids and energy storing means in parallel with said impedance.

6. An electrical conversion system for transferring energy between alternating and direct current circuits comprising a transformer connected to said system, a make-alive type valve connected to each terminal of said transformer, make-alive electrodes for exciting said valves, means including auxiliary electric valves for supplying current to said make-alive electrodes, a winding having a voltage induced therein upon the occurrence of a backfire in one of said valves, grids in said auxiliary valves and a valve for impressing said voltage on said grids to interrupt the flow of current to the make-alive electrode.

7. An electrical conversion system for transferring energy between alternating and direct current circuits comprising a transformer connected to said system, a make-alive type valve connected to each terminal of said transformer, make-alive electrodes for exciting said valves, means including auxiliary electric valves for supplying current to said make-alive electrodes, a winding having a voltage induced therein upon the occurrence of a backfire in one of said valves, grids in said auxiliary valves and a valve for impressing said voltage on said grids to interrupt the flow of current to the make-alive electrode and energy storing means for maintaining said auxiliary valves in a blocked condition for a predetermined time interval after the occurrence of a backfire.

DANIEL SILVERMAN.